(12) United States Patent
Gelwan et al.

(10) Patent No.: US 10,384,791 B2
(45) Date of Patent: Aug. 20, 2019

(54) CROSS ENGINE COORDINATION DURING GAS TURBINE ENGINE MOTORING

(71) Applicant: United Technologies Corporation, Farmington, CT (US)

(72) Inventors: David Gelwan, Glastonbury, CT (US); Jesse W. Clauson, Agawam, MA (US); James K. Berry, Bolton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 100 days.

(21) Appl. No.: 15/652,320

(22) Filed: Jul. 18, 2017

(65) Prior Publication Data
US 2018/0022464 A1 Jan. 25, 2018

Related U.S. Application Data

(60) Provisional application No. 62/365,090, filed on Jul. 21, 2016.

(51) Int. Cl.
*B64D 31/12* (2006.01)
*F01D 21/00* (2006.01)
(Continued)

(52) U.S. Cl.
CPC .............. *B64D 31/12* (2013.01); *F01D 13/00* (2013.01); *F01D 19/00* (2013.01); *F01D 21/003* (2013.01);
(Continued)

(58) Field of Classification Search
CPC . B64F 1/34; B64D 31/12; B64D 41/00; F02C 9/42; F02C 6/00; F02C 6/20;
(Continued)

(56) References Cited

U.S. PATENT DOCUMENTS

| 1,951,875 A | 3/1934 | Laabs |
| 2,617,253 A | 11/1952 | Fusner et al. |

(Continued)

FOREIGN PATENT DOCUMENTS

| EP | 1258618 A2 | 11/2002 |
| EP | 2305986 | 4/2011 |

(Continued)

OTHER PUBLICATIONS

Calculation Method and Simulation of Air Bleeding Loss for Aircraft Start System; San Mai Su ; Sen Li ; Jun Ma; 2018 37th Chinese Control Conference (CCC); pp. 1764-1769; IEEE Conferences; year 2018.*

(Continued)

*Primary Examiner* — Cuong H Nguyen
(74) *Attorney, Agent, or Firm* — Cantor Colburn LLP

(57) ABSTRACT

A system is provided for cross engine coordination during gas turbine engine motoring. The system includes a first gas turbine engine of a first engine system, a first air turbine starter of the first engine system, a first starter air valve of the first engine system, and a controller. The controller is operable to command the first starter air valve to control delivery of compressed air to the first air turbine starter during motoring of the first gas turbine engine, monitor cross engine data of a second gas turbine engine of a second engine system to detect a present condition or a commanded action that modifies an aspect of the compressed air received at the first starter air valve, and command an adjustment to the first engine system to compensate for the modified aspect of the compressed air based on the cross engine data.

20 Claims, 6 Drawing Sheets

(51) Int. Cl.
*F01D 19/00* (2006.01)
*F02C 6/20* (2006.01)
*F02C 7/277* (2006.01)
*F01D 13/00* (2006.01)
*F02C 6/00* (2006.01)
*B64D 41/00* (2006.01)
*B64F 1/34* (2006.01)

(52) U.S. Cl.
CPC ............... *F02C 6/00* (2013.01); *F02C 6/20* (2013.01); *F02C 7/277* (2013.01); *B64D 41/00* (2013.01); *B64F 1/34* (2013.01); *F05D 2220/323* (2013.01); *F05D 2270/13* (2013.01); *F05D 2270/304* (2013.01); *F05D 2270/312* (2013.01); *F05D 2270/54* (2013.01)

(58) Field of Classification Search
CPC .............. F02C 7/277; F05D 2220/323; F05D 2270/13; F05D 2270/54; F05D 2270/304; F05D 2270/312
USPC ........................... 701/100; 60/772, 778, 786
See application file for complete search history.

(56) References Cited

U.S. PATENT DOCUMENTS

| | | | |
|---|---|---|---|
| 2,840,987 | A | 7/1958 | Bloomberg et al. |
| 2,962,597 | A | 11/1960 | Evans |
| 3,057,155 | A | 10/1962 | Rizk |
| 3,098,626 | A | 7/1963 | Messinger |
| 3,151,452 | A | 10/1964 | Bunger et al. |
| 3,764,815 | A | 10/1973 | Habock et al. |
| 3,793,905 | A | 2/1974 | Black et al. |
| 3,812,378 | A | 5/1974 | Coman |
| 3,898,439 | A | 8/1975 | Reed et al. |
| 3,951,008 | A | 4/1976 | Schneider et al. |
| 4,044,550 | A | 8/1977 | Vermilye |
| 4,069,424 | A | 1/1978 | Burkett |
| 4,144,421 | A | 3/1979 | Sakai |
| 4,380,146 | A | 4/1983 | Yannone et al. |
| 4,598,551 | A | 7/1986 | Dimitroff, Jr. et al. |
| 4,627,234 | A | 12/1986 | Schuh |
| 4,669,893 | A | 6/1987 | Chalaire et al. |
| 4,713,985 | A | 12/1987 | Ando |
| 4,733,529 | A | 3/1988 | Nelson et al. |
| 4,854,120 | A | 8/1989 | Nelson et al. |
| 4,979,362 | A | 12/1990 | Vershure, Jr. |
| 4,979,365 | A * | 12/1990 | Baker ................ F03G 7/06 60/527 |
| 5,103,629 | A | 4/1992 | Mumford et al. |
| 5,123,239 | A | 6/1992 | Rodgers |
| 5,127,220 | A | 7/1992 | Jesrai et al. |
| 5,174,109 | A | 12/1992 | Lampe |
| 5,184,458 | A | 2/1993 | Lampe et al. |
| 5,201,798 | A | 4/1993 | Hogan |
| 5,349,814 | A | 9/1994 | Ciokajlo et al. |
| 6,146,090 | A | 11/2000 | Schmidt |
| 6,168,377 | B1 | 1/2001 | Wolfe et al. |
| 6,190,127 | B1 | 2/2001 | Schmidt |
| 6,318,958 | B1 | 11/2001 | Giesler et al. |
| 6,478,534 | B2 | 11/2002 | Bangert et al. |
| 6,498,978 | B2 | 12/2002 | Leamy et al. |
| 6,517,314 | B1 | 2/2003 | Burnett et al. |
| 6,558,118 | B1 | 5/2003 | Brisson et al. |
| 6,681,579 | B2 | 1/2004 | Lane et al. |
| 6,762,512 | B2 | 7/2004 | Nelson |
| 6,884,027 | B2 | 4/2005 | Faulkner |
| 6,935,836 | B2 | 8/2005 | Ress, Jr. et al. |
| 7,104,072 | B2 | 9/2006 | Thompson |
| 7,133,801 | B2 | 11/2006 | Song |
| 7,409,319 | B2 | 8/2008 | Kant et al. |
| 7,428,819 | B2 | 9/2008 | Cataldi et al. |
| 7,507,070 | B2 | 3/2009 | Jones |
| 7,513,119 | B2 * | 4/2009 | Zielinski ................ F02C 7/262 60/204 |
| 7,543,439 | B2 | 6/2009 | Butt et al. |
| 7,587,133 | B2 | 9/2009 | Franke et al. |
| 7,742,881 | B2 | 6/2010 | Muralidharan et al. |
| 7,770,400 | B2 | 8/2010 | Iasillo et al. |
| 7,909,566 | B1 | 3/2011 | Brostmeyer |
| 7,972,105 | B2 | 7/2011 | Dejoris et al. |
| 8,090,456 | B2 | 1/2012 | Karpman et al. |
| 8,291,715 | B2 | 10/2012 | Libera et al. |
| 8,306,776 | B2 | 11/2012 | Ihara et al. |
| 8,770,913 | B1 | 7/2014 | Negron et al. |
| 8,776,530 | B2 | 7/2014 | Shirooni et al. |
| 8,820,046 | B2 | 9/2014 | Ross et al. |
| 8,918,264 | B2 | 12/2014 | Jegu et al. |
| 9,046,111 | B2 | 6/2015 | Harvey et al. |
| 9,086,018 | B2 | 7/2015 | Winston et al. |
| 9,103,284 | B2 | 8/2015 | Erickson et al. |
| 9,121,309 | B2 | 9/2015 | Geiger |
| 9,732,762 | B2 | 8/2017 | Duong et al. |
| 10,125,690 | B2 * | 11/2018 | Zaccaria ................ F02C 7/277 |
| 2002/0173897 | A1 * | 11/2002 | Leamy ................ F02C 9/28 701/100 |
| 2003/0145603 | A1 | 8/2003 | Reed et al. |
| 2004/0000656 | A1 | 1/2004 | Wiggins et al. |
| 2004/0131138 | A1 | 7/2004 | Correia et al. |
| 2009/0301053 | A1 | 12/2009 | Geiger |
| 2010/0085676 | A1 | 4/2010 | Wilfert |
| 2010/0095791 | A1 | 4/2010 | Galloway |
| 2010/0132365 | A1 | 6/2010 | Labala |
| 2010/0293961 | A1 | 11/2010 | Tong et al. |
| 2010/0326085 | A1 * | 12/2010 | Veilleux ................ B64C 27/14 60/778 |
| 2011/0077783 | A1 | 3/2011 | Karpman et al. |
| 2011/0146276 | A1 | 6/2011 | Sathyanarayana et al. |
| 2011/0153295 | A1 | 6/2011 | Yerramalla et al. |
| 2011/0296843 | A1 | 12/2011 | Lawson, Jr. |
| 2012/0240591 | A1 | 9/2012 | Snider et al. |
| 2012/0266601 | A1 | 10/2012 | Miller |
| 2012/0266606 | A1 | 10/2012 | Zeiner et al. |
| 2013/0031912 | A1 | 2/2013 | Finney et al. |
| 2013/0091850 | A1 | 4/2013 | Francisco |
| 2013/0101391 | A1 | 4/2013 | Szwedowicz et al. |
| 2013/0251501 | A1 | 9/2013 | Araki et al. |
| 2014/0123673 | A1 | 5/2014 | Mouze et al. |
| 2014/0154087 | A1 | 6/2014 | Kirchner et al. |
| 2014/0199157 | A1 | 7/2014 | Haerms et al. |
| 2014/0241878 | A1 | 8/2014 | Herrig et al. |
| 2014/0271152 | A1 | 9/2014 | Rodriguez |
| 2014/0283527 | A1 | 9/2014 | Ling et al. |
| 2014/0301820 | A1 | 10/2014 | Lohse et al. |
| 2014/0318144 | A1 | 10/2014 | Lazzeri et al. |
| 2014/0334927 | A1 | 11/2014 | Hammerum |
| 2014/0366546 | A1 | 12/2014 | Bruno et al. |
| 2014/0373518 | A1 | 12/2014 | Manneville et al. |
| 2014/0373552 | A1 | 12/2014 | Zaccaria et al. |
| 2014/0373553 | A1 * | 12/2014 | Zaccaria ................ F02C 7/277 60/778 |
| 2014/0373554 | A1 | 12/2014 | Pech et al. |
| 2015/0016949 | A1 | 1/2015 | Smith |
| 2015/0096359 | A1 | 4/2015 | Catt |
| 2015/0115608 | A1 | 4/2015 | Draper |
| 2015/0121874 | A1 | 5/2015 | Yoshida et al. |
| 2015/0128592 | A1 | 5/2015 | Filiputti et al. |
| 2015/0159625 | A1 | 6/2015 | Hawdwicke, Jr. et al. |
| 2015/0167553 | A1 | 6/2015 | Nesdill et al. |
| 2016/0332736 | A1 | 11/2016 | Parmentier et al. |
| 2016/0348588 | A1 | 12/2016 | Ross et al. |
| 2017/0233089 | A1 | 8/2017 | Zaccaria et al. |
| 2017/0234235 | A1 * | 8/2017 | Pech ................ F02C 7/27 290/31 |
| 2017/0234238 | A1 * | 8/2017 | Schwarz ................ F02C 7/268 60/778 |
| 2018/0022463 | A1 * | 1/2018 | Teicholz ................ B64D 27/12 60/778 |
| 2018/0022465 | A1 | 1/2018 | Gelwan et al. |
| 2018/0023413 | A1 | 1/2018 | Chowdhury et al. |
| 2018/0023479 | A1 | 1/2018 | Clauson et al. |
| 2018/0023484 | A1 | 1/2018 | Gelwan et al. |
| 2018/0045122 | A1 | 2/2018 | Veilleux |

(56) References Cited

U.S. PATENT DOCUMENTS

| | | |
|---|---|---|
| 2018/0094588 A1 | 4/2018 | Clauson et al. |
| 2018/0149090 A1 | 5/2018 | Maalouf et al. |
| 2018/0230946 A1 | 8/2018 | Virtue, Jr. et al. |

FOREIGN PATENT DOCUMENTS

| | | |
|---|---|---|
| EP | 2514949 A2 | 10/2012 |
| EP | 3205836 A1 | 8/2017 |
| EP | 3205843 A1 | 8/2017 |
| EP | 3205849 A1 | 8/2017 |
| EP | 3205859 A1 | 8/2017 |
| EP | 3208429 A1 | 8/2017 |
| EP | 3273007 A1 | 1/2018 |
| EP | 3273008 A1 | 1/2018 |
| FR | 2933131 | 1/2010 |
| GB | 1186375 | 4/1970 |
| GB | 1374810 | 11/1974 |
| GB | 2117842 | 10/1983 |
| IN | 201408865 | 5/2015 |
| JP | 2002371806 | 12/2002 |
| JP | 2004036414 | 2/2004 |
| WO | 9900585 | 1/1999 |
| WO | 2013007912 | 1/2013 |
| WO | 2014152701 | 9/2014 |
| WO | 2015030946 | 3/2015 |
| WO | 2015145034 A1 | 10/2015 |
| WO | 2016203157 A1 | 12/2016 |

OTHER PUBLICATIONS

Second law analysis of extra power requirements for a cascade of industrial compressors; S. Strevell ; F. Wicks; IECEC-97 Proceedings of the Thirty-Second Intersociety Energy Conversion Engineering Conference (Cat. No. 97CH6203); vol. 3 , pp. 1581-1586; IEE Conferences; year 1997.*

EP Application No. 17200204.0 Extended EP Search Report dated May 15, 2018, 6 pages.

European Search Report for Application No. EP17194050, dated Feb. 8, 2018 (6 pp.).

Extended European Search Report for Application No. 17181728.1-1607 dated Dec. 21, 2017 (8 pp.).

Extended European Search Report for Application No. 17181931.1-1607 dated Dec. 8, 2017 (7 pp.).

Extended European Search Report for Application No. 17181979.0-1607 dated Dec. 13, 2017 (8 pp.).

Extended European Search Report for Application No. 17182145.7-1607 dated Dec. 7, 2017 (7 pp.).

Extended European Search Report for Application No. 17182405.5-1607 dated Dec. 18, 2017 (7 pp.).

Extended European Search Report for Application No. 17182126.7-1007, dated Feb. 16, 2018 (7 pp.).

Extended European Search Report for Application No. 17199896.6-1006, dated Mar. 7, 2018 (11 pp.).

EP Application No. 17199896.6 Office Action dated Dec. 11, 2018, 3 pages.

* cited by examiner

CROSS ENGINE COORDINATION DURING GAS TURBINE ENGINE MOTORING

CROSS-REFERENCE TO RELATED APPLICATIONS

This patent application claims priority to U.S. Provisional Application No. 62/365,090, filed Jul. 21, 2016, which is incorporated herein by reference in its entirety.

BACKGROUND

This disclosure relates to gas turbine engines, and more particularly to systems and methods for cross engine coordination during gas turbine engine motoring.

Gas turbine engines are used in numerous applications, one of which is for providing thrust to an airplane. When the gas turbine engine of an airplane has been shut off for example, after an airplane has landed at an airport, the engine is hot and due to heat rise, the upper portions of the engine will be hotter than lower portions of the engine. When this occurs thermal expansion may cause deflection of components of the engine which may result in a "bowed rotor" condition. If a gas turbine engine is in such a bowed rotor condition it is undesirable to restart or start the engine.

One approach to mitigating a bowed rotor condition is to use a starter system to drive rotation of a spool within the engine for an extended period of time at a speed below which a resonance occurs (i.e., a critical speed or frequency) that may lead to damage when a sufficiently large bowed rotor condition is present. Motoring is typically performed separately for each engine, which extends the total start time for a multi-engine aircraft.

BRIEF DESCRIPTION

In an embodiment, a system is provided for cross engine coordination during gas turbine engine motoring. The system includes a first gas turbine engine of a first engine system, a first air turbine starter of the first engine system, a first starter air valve of the first engine system, and a controller. The controller is operable to command the first starter air valve to control delivery of compressed air to the first air turbine starter during motoring of the first gas turbine engine, monitor cross engine data of a second gas turbine engine of a second engine system to detect a present condition or a commanded action that modifies an aspect of the compressed air received at the first starter air valve, and command an adjustment to the first engine system to compensate for the modified aspect of the compressed air based on the cross engine data.

In addition to one or more of the features described above, or as an alternative to any of the foregoing embodiments, further embodiments may include where the compressed air is driven by an auxiliary power unit of the aircraft, a ground cart, or a cross engine bleed.

In addition to one or more of the features described above, or as an alternative to any of the foregoing embodiments, further embodiments may include where the controller commands the first starter air valve based on one or more of: an engine speed of a starting spool of the first gas turbine engine, a starter speed of the first air turbine starter, and a starter air pressure.

In addition to one or more of the features described above, or as an alternative to any of the foregoing embodiments, further embodiments may include where the adjustment to the first engine system maintains the engine speed of the starting spool of the first gas turbine engine below a resonance speed of the starting spool during motoring.

In addition to one or more of the features described above, or as an alternative to any of the foregoing embodiments, further embodiments may include where the present condition includes one or more of: a detected fault condition of a second air turbine starter of the second engine system, a detected fault condition of a second starter air valve of the second engine system, a transition to start motoring of the second gas turbine engine, a transition to stop motoring of the second gas turbine engine, and a control input or modeled value to control motoring of the second gas turbine engine.

In addition to one or more of the features described above, or as an alternative to any of the foregoing embodiments, further embodiments may include where the commanded action includes a commanded change in state of one or more of: a second starter air valve of the second engine system, an engine shutoff valve, and a bleed valve operable to release a portion of the compressed air.

In addition to one or more of the features described above, or as an alternative to any of the foregoing embodiments, further embodiments may include where the cross engine data further includes a scheduled adjustment of one or more control parameters of the second engine system.

In addition to one or more of the features described above, or as an alternative to any of the foregoing embodiments, further embodiments may include where the adjustment to the first engine system is based on monitoring a rate of change of one or more parameters received in the cross engine data.

According to an embodiment, a system of an aircraft includes a compressed air source operable to supply compressed air, a first engine system, a second engine system, and a communication bus. The first engine system includes a first gas turbine engine, a first air turbine starter, a first starter air valve, and a first controller operable to command the first starter air valve to control delivery of the compressed air to the first air turbine starter during motoring of the first gas turbine engine. The second engine system includes a second gas turbine engine, a second air turbine starter, a second starter air valve, and a second controller operable to command the second starter air valve to control delivery of the compressed air to the second air turbine starter during motoring of the second gas turbine engine. The communication bus is operable to establish communication of cross engine data between the first controller and the second controller, where the first controller is operable to command an adjustment to the first engine system based on the cross engine data from the second controller, and the second controller is operable to command an adjustment to the second engine system based on the cross engine data from the first controller.

In addition to one or more of the features described above, or as an alternative to any of the foregoing embodiments, further embodiments may include where the first controller commands the first starter air valve based on one or more of: an engine speed of a starting spool of the first gas turbine engine, a starter speed of the first air turbine starter, and a starter air pressure of the first engine system, and where the second controller commands the second starter air valve based on one or more of: an engine speed of a starting spool of the second gas turbine engine, a starter speed of the second air turbine starter, and a starter air pressure of the second engine system.

In addition to one or more of the features described above, or as an alternative to any of the foregoing embodiments, further embodiments may include where the first engine system maintains the engine speed of the starting spool of the first gas turbine engine below a resonance speed during motoring of the first gas turbine engine, and the second engine system maintains the engine speed of the starting spool of the second gas turbine engine below the resonance speed during motoring of the second gas turbine engine.

In addition to one or more of the features described above, or as an alternative to any of the foregoing embodiments, further embodiments may include where the cross engine data includes one or more of: a detected fault condition of the first or second air turbine starter, a detected fault condition of the first or second starter air valve, a transition to start motoring of the first or second gas turbine engine, a transition to stop motoring of the first or second gas turbine engine, and a control input or modeled value to control motoring of the first or second gas turbine engine.

In addition to one or more of the features described above, or as an alternative to any of the foregoing embodiments, further embodiments may include where the cross engine data includes a commanded change in state of one or more of: the first starter air valve, the second starter air valve, an engine shutoff valve, and a bleed valve operable to release a portion of the compressed air.

In addition to one or more of the features described above, or as an alternative to any of the foregoing embodiments, further embodiments may include where the cross engine data further includes a scheduled adjustment of one or more control parameters of the first or second engine system.

Another embodiment includes a method for cross engine coordination during gas turbine engine motoring. The method includes commanding, by a controller, a first starter air valve to control delivery of compressed air to a first air turbine starter during motoring of a first gas turbine engine of a first engine system. The controller monitors cross engine data of a second gas turbine engine of a second engine system to detect a present condition or a commanded action that modifies an aspect of the compressed air received at the first starter air valve. An adjustment is commanded to the first engine system to compensate for the modified aspect of the compressed air based on the cross engine data.

In addition to one or more of the features described above, or as an alternative to any of the foregoing embodiments, further embodiments may include commanding the first starter air valve based on one or more of: an engine speed of a starting spool of the first gas turbine engine, a starter speed of the first air turbine starter, and a starter air pressure, where the adjustment to the first engine system maintains the engine speed of the starting spool of the first gas turbine engine below a resonance speed of the starting spool during motoring.

A technical effect of the apparatus, systems and methods is achieved by using coordinated control for bowed rotor mitigation of gas turbine engines as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
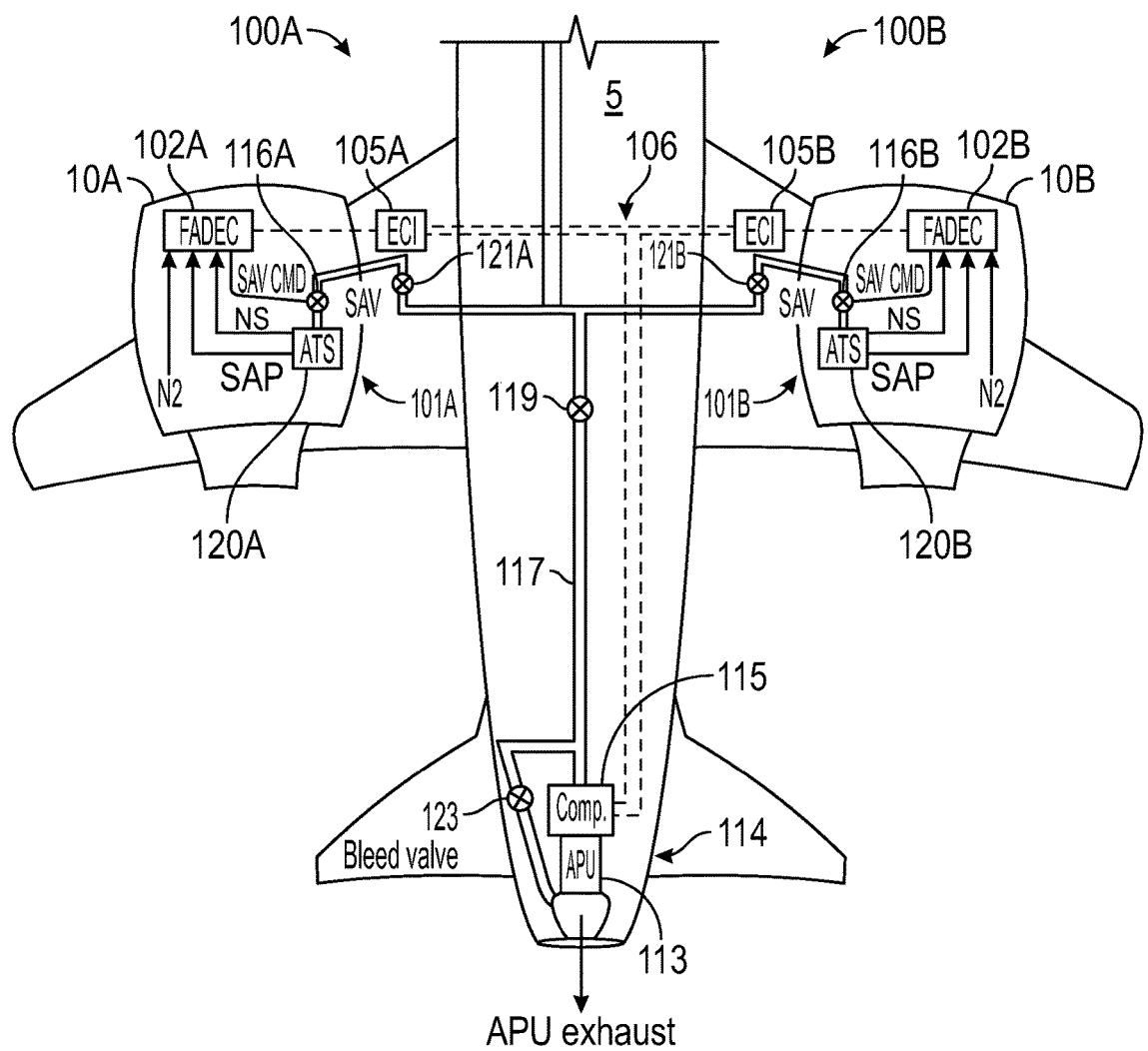
FIG. 1 is a schematic illustration of an aircraft engine starting system in accordance with an embodiment of the disclosure.

Various embodiments of the present disclosure are related to a bowed rotor start mitigation system in a gas turbine engine. Embodiments can include using a starter air valve to control a rotor speed of a starting spool of a gas turbine engine to mitigate a bowed rotor condition using a dry motoring process. During dry motoring, the starter air valve can be actively adjusted to deliver air pressure (i.e., compressed air) from an air supply to an air turbine starter of an engine starting system that controls starting spool rotor speed. Dry motoring may be performed by running an engine starting system at a lower speed with a longer duration than typically used for engine starting while dynamically adjusting the starter air valve to maintain the rotor speed and/or follow a dry motoring profile. Some embodiments increase the rotor speed of the starting spool to approach a critical rotor speed gradually and as thermal distortion is decreased they then accelerate beyond the critical rotor speed to complete the engine starting process. The critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor, especially in the high pressure compressor if the rotor is straddle-mounted.

A dry motoring profile for dry motoring can be selected based on various parameters, such as a modeled temperature value of the gas turbine engine used to estimate heat stored in the engine core when a start sequence is initiated and identify a risk of a bowed rotor. The modeled temperature value alone or in combination with other values (e.g., measured temperatures) can be used to calculate a bowed rotor risk parameter. For example, the modeled temperature can be adjusted relative to an ambient temperature when calculating the bowed rotor risk parameter. The bowed rotor risk parameter may be used to take a control action to mitigate the risk of starting the gas turbine engine with a bowed rotor. The control action can include dry motoring consistent with the dry motoring profile. In some embodiments, a targeted rotor speed profile of the dry motoring profile can be adjusted as dry motoring is performed.

A full authority digital engine control (FADEC) system or other system may send a message to the cockpit to inform the crew of an extended time start time due to bowed rotor mitigation actions prior to completing an engine start sequence. If the engine is in a ground test or in a test stand, a message can be sent to the test stand or cockpit based on the control-calculated risk of a bowed rotor. A test stand crew can be alerted regarding a requirement to keep the starting spool of the engine to a speed below the known resonance speed of the rotor in order to homogenize the temperature of the rotor and the casings about the rotor which also are distorted by temperature non-uniformity.

In order to further reduce total start time, embodiments enable dry motoring of multiple engines at the same time. Respective FADECs for each engine can exchange cross engine data including parameters that identify present conditions, commanded actions, scheduled adjustments, and the like which may impact control decisions of each FADEC in performing dry motoring while maintaining the engine speed of the starting spool of each respective engine below a resonance speed.

Referring now to FIG. 1, a schematic illustration of an aircraft 5 is depicted with a pair of engine systems 100A, 100B. Engine systems 100A, 100B include gas turbine engines 10A, 10B and engine starting systems 101A, 101B respectively. Engine systems 100A, 100B also include FADECs 102A, 102B to control gas turbine engines 10A, 10B and starting systems 101A, 101B. FADECs 102A, 102B may generally be referred to as controllers. FADECs 102A, 102B can communicate with respective engine control interfaces 105A, 105B using a digital communication bus 106. The engine control interfaces 105A, 105B can buffer engine system communication from aircraft level communication. Although depicted separately in FIG. 1, in some embodiments the engine control interfaces 105A, 105B are integrated with the FADECs 102A, 102B.

In an embodiment, the FADECs 102A, 102B and engine control interfaces 105A, 105B may each include memory to store instructions that are executed by one or more processors on one or more channels. The executable instructions may be stored or organized in any manner and at any level of abstraction, such as in connection with a controlling and/or monitoring operation of the gas turbine engines 10A, 10B of FIG. 1. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

In the example of FIG. 1, an auxiliary power unit (APU) 113 and compressor 115 provide a compressed air source 114 to drive air turbine starters 120A, 120B of engine starting systems 101A, 101B. Compressed air from the compressed air source 114 is routed through ducts 117 and air starter valves 116A, 116B to the air turbine starters 120A, 120B. Various shutoff valves can also be included in ducts 117, such as a main shutoff valve 119 and engine shutoff valves 121A, 121B. One or more bleed valves 123 can be used to release compressed air from the ducts 117.

In some cases, dry motoring can be performed simultaneously for engine systems 100A, 100B, where compressed air from the compressed air source 114 is provided to both air turbine starters 120A, 120B at the same time. When one of the engine systems 100A, 100B completes dry motoring before the other, a disturbance or pressure surge of compressed air may be experienced at the starter air valve 116A, 116B and air turbine starter 120A, 120B of the engine system 100A, 100B still performing dry motoring. The FADECs 102A, 102B can be configured with control laws to maintain a motoring speed below a threshold level (i.e., the critical rotor speed) for the engine system 100A, 100B while performing dry motoring based on compressed air source 114. In embodiments, FADECs 102A, 102B can observe various engine parameters and starting system parameters to actively control dry motoring and prevent fault conditions from damaging the gas turbine engines 10A, 10B. For example, FADECs 102A, 102B can observe engine speeds (N2) of gas turbine engines 10A, 10B and may receive starter system parameters such as starter speeds (NS) and/or starter air pressures (SAP). In embodiments, FADECs 102A, 102B can adjust starter air valves 116A, 116B based on measured feedback to reject disturbances attributable to dual to single or single to dual engine starting transitions, such as switching from dry motoring both gas turbine engines 10A, 10B to dry motoring either gas turbine engine 10A or 10B.

To further enhance control aspects, the FADECs 102A, 102B can exchange cross engine data including parameters that directly or indirectly modify an aspect of the compressed air received at the starter air valves 116A, 116B. Cross engine data can be sent on the digital communication bus 106 or an alternate link (e.g., cross engine bus 106A of FIG. 2). Cross engine data may include fault information, such as a detected failure of the starter air valves 116A, 116B and/or the air turbine starters 120A, 120B. Present condition information and/or commands included in the cross engine data can allow the FADECs 102A, 102B to track and/or predict events that will impact available compressed air for dry motoring at each of the engine starting systems 101A, 101B.

Although FIG. 1 depicts one example configuration, it will be understood that embodiments as described herein can cover a wide range of configurations, such as a four engine system. Further, the compressed air source 114 can include multiple sources other than APU 113 and compressor 115, such as a ground cart or cross engine bleed air.

Figure 2:
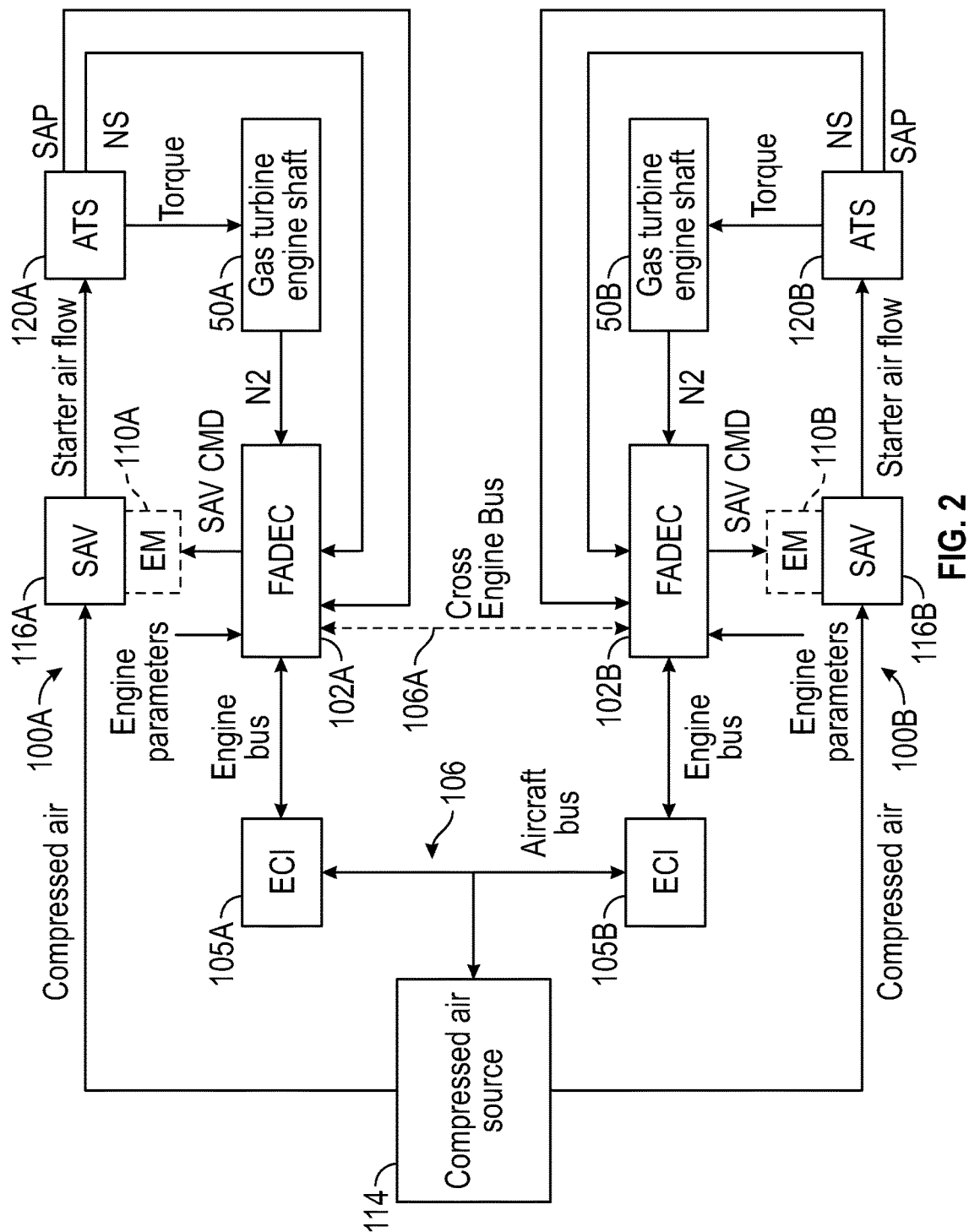
FIG. 2 is another schematic illustration of an aircraft engine starting system in accordance with an embodiment of the disclosure.

Turning now to FIG. 2, a schematic of engine systems 100A, 100B and engine starting systems 101A, 101B for the gas turbine engines 10A, 10B of FIG. 1 are depicted according to an embodiment. In the example of FIG. 2, the digital communication bus 106 can include an aircraft, engine, and/or test stand communication bus to interface with FADECs 102A, 102B, engine control interfaces 105A, 105B, aircraft controls, e.g., a cockpit, various onboard computer systems, and/or a test stand (not depicted). In some embodiments, a cross engine bus 106A provides a link between FADECs 102A, 102B as a lower latency communication path between engine systems 100A, 100B, for instance, by avoiding shared communication scheduling conflicts with other aircraft level systems. Either or both channels of FADECs 102A, 102B can alternate on and off commands to respective electromechanical devices 110A, 110B coupled to starter air valves 116A, 116B to achieve a partially open position of the starter air valves 116A, 116B to control a flow of compressed air from compressed air source 114 (e.g., APU 113 and compressor 115 of FIG. 1) as a starter air flow to air turbine starters 120A, 120B during dry motoring. The air turbine starters 120A, 120B output torque to drive rotation of respective gas turbine engine shafts 50A, 50B of starting spools of the gas turbine engines 10A, 10B.

The FADECs 102A, 102B can monitor engine speed (N2), starter speed (NS), starter air pressure (SAP), and/or other engine parameters to determine an engine operating state and control the starter air valves 116A, 116B. Thus, the FADECs 102A, 102B can each establish a control loop with respect to a motoring speed (N2 and/or NS) and/or starter air pressure to adjust positioning of the starter air valves 116A, 116B. The FADECs 102A, 102B can also exchange cross engine data on digital communication bus 106 and/or cross engine bus 106A to include present conditions and commands of each engine system 100A, 100B into local control decisions that may impact characteristics of the compressed air available at the starter air valves 116A, 116B.

In some embodiments, the starter air valves 116A, 116B are discrete valves designed as on/off valves that are typically commanded to either fully opened or fully closed. However, there is a time lag to achieve the fully open position and the fully closed position. By selectively alternating an on-command time with an off-command time through the electromechanical devices 110A, 110B, intermediate positioning states (i.e., partially opened/closed) can be achieved. The FADECs 102A, 102B can modulate the on and off commands (e.g., as a duty cycle using pulse width modulation) to the electromechanical devices 110A, 110B to further open the starter air valves 116A, 116B and increase a rotational speed of the gas turbine engine shafts 50A, 50B. In an embodiment, the electromechanical devices 110A, 110B have a cycle time defined between an off-command to an on-command to the off-command that is at most half of a movement time for the starter air valves 116A, 116B to transition from fully closed to fully open. Pneumatic lines or mechanical linkage (not depicted) can be used to drive the starter air valves 116A, 116B between the open position and the closed position. The electromechanical devices 110A, 110B can each be a solenoid that positions the starter air valves 116A, 116B based on intermittently supplied electric power as commanded by the FADECs 102A, 102B. In an alternate embodiment, the electromechanical devices 110A, 110B are electric valves controlling muscle air to adjust the position of the starter air valves 116A, 116B as commanded by the FADECs 102A, 102B.

In an alternate embodiment, rather than using electromechanical devices 110A, 110B to achieve a partially open position of the starter air valves 116A, 116B, the starter air valves 116A, 116B can be variable position valves that are dynamically adjustable to selected valve angles by the FADECs 102A, 102B. When implemented as variable position valves, the starter air valves 116A, 116B can be continuous/infinitely adjustable and hold a commanded valve angle, which may be expressed in terms of a percentage open/closed and/or an angular value (e.g., degrees or radians). Performance parameters of the starter air valves 116A, 116B can be selected to meet dynamic response requirements. For example, in some embodiments, the starter air valves 116A, 116B each have a response rate of 0% to 100% open in less than 40 seconds. In other embodiments, the starter air valves 116A, 116B each have a response rate of 0% to 100% open in less than 30 seconds. In further embodiments, the starter air valves 116A, 116B each have a response rate of 0% to 100% open in less than 20 seconds.

In some embodiments, the FADECs 102A, 102B can each monitor a valve angle of the starter air valves 116A, 116B when valve angle feedback is available. The FADECs 102A, 102B can establish an outer control loop with respect to motoring speed and an inner control loop with respect to the valve angle of the starter air valves 116A, 116B. Valve angle feedback and/or valve commands can be included in the cross engine data exchanged between the FADECs 102A, 102B.

Figure 3:
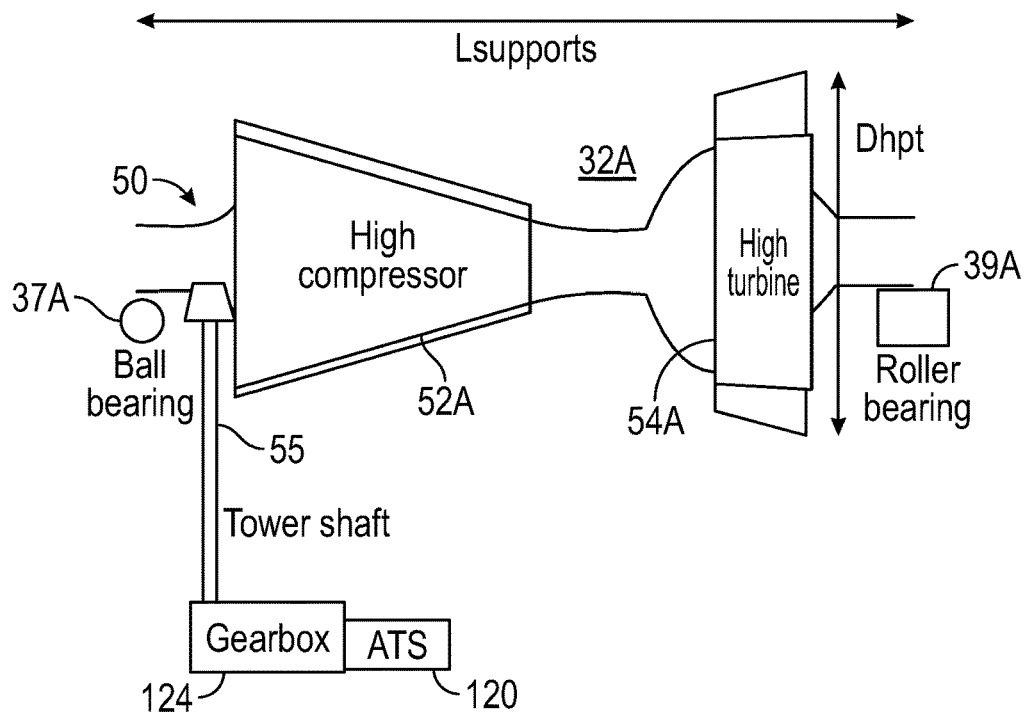
FIG. 3 is a schematic illustration of a high spool gas path with a straddle-mounted spool in accordance with an embodiment of the disclosure.
Figure 4:
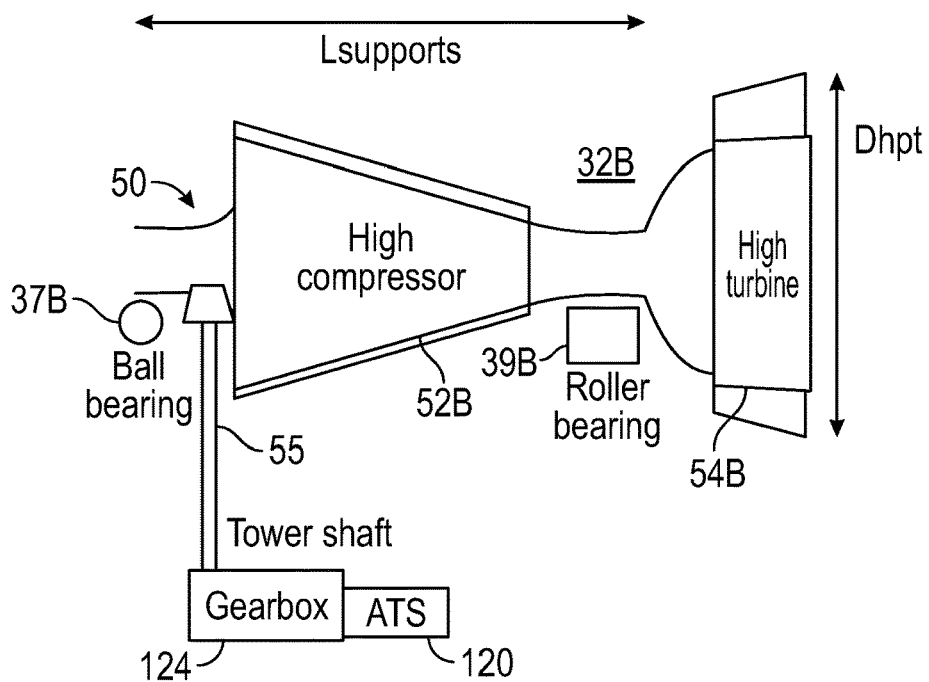
FIG. 4 is a schematic illustration of a high spool gas path with an overhung spool in accordance with an embodiment of the disclosure.

FIGS. 3 and 4 depict two example engine configurations of the gas turbine engines 10A, 10B of FIG. 1. FIG. 3 is an example of a straddle-mounted spool 32A as a starting spool configuration. This configuration places two bearing compartments 37A and 39A (which may include a ball bearing and a roller bearing respectively), outside of the plane of most of the compressor disks of high pressure compressor 52A and at outside at least one of the turbine disks of high pressure turbine 54A. In contrast with a straddle-mounted spool arrangement, other embodiments may be implemented using an over-hung mounted spool 32B as depicted in FIG. 4 as a starting spool configuration. In over-hung mounted spool 32B, a bearing compartment 37B is located forward of the first turbine disk of high pressure turbine 54B such that the high pressure turbine 54B is overhung, and it is physically located aft of its main supporting structure. The use of straddle-mounted spools has advantages and disadvantages in the design of a gas turbine, but one characteristic of the straddle-mounted design is that the span between the bearing compartments 37A and 39A is long, making the amplitude of the high spot of a bowed rotor greater and the resonance speed that cannot be transited prior to temperature homogenization is lower. For any thrust rating, the straddle mounted arrangement, such as straddle-mounted spool 32A, gives Lsupport/Dhpt values that are higher, and the over-hung mounted arrangement, such as overhung spool 32B, can be as much as 60% of the straddle-mounted Lsupport/Dhpt. Lsupport is the distance between bearings (e.g., between bearing compartments 37A and 39A or between bearing compartments 37B and 39B), and Dhpt is the diameter of the last blade of the high pressure turbine (e.g., high pressure turbine 54A or high pressure turbine 54B). As one example, a straddle-mounted engine starting spool, such as straddle-mounted spool 32A, with a roller bearing at bearing compartment 39A located aft of the high pressure turbine 54A may be more vulnerable to bowed rotor problems since the Lsupport/Dhpt ranges from 1.9 to 5.6.

FIGS. 3 and 4 also illustrate an air turbine starter 120 (e.g., air turbine starter 120A or 120B of FIGS. 1 and 2) interfacing through gearbox 124 via a tower shaft 55 with the straddle-mounted spool 32A proximate high compressor 52A and interfacing via tower shaft 55 with the overhung mounted spool 32B proximate high compressor 52B as part of a starting system. The straddle-mounted spool 32A and the over-hung mounted spool 32B are both examples of a starter spool having a gas turbine engine shaft 50 driven by the air turbine starter 120, such as gas turbine engine shafts 50A, 50B driven by air turbine starters 120A, 120B of FIG. 2.

Figure 5:
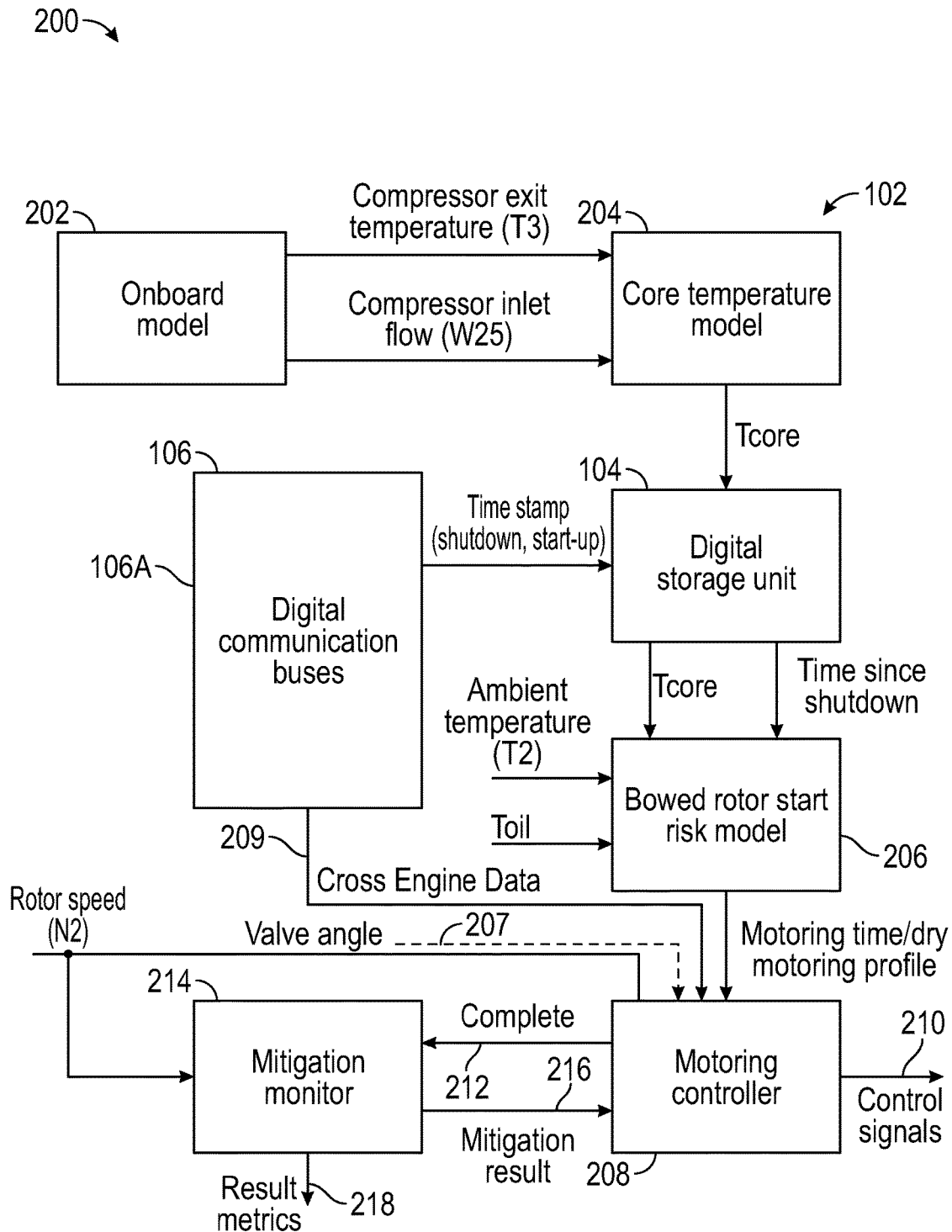
FIG. 5 is a block diagram of a system for bowed rotor start mitigation in accordance with an embodiment of the disclosure.

FIG. 5 is a block diagram of a system 200 for bowed rotor start mitigation that may control either of the starter air valves 116A, 116B of FIGS. 1 and 2 via control signals 210 in accordance with an embodiment. The system 200 may also be referred to as a bowed rotor start mitigation system. In the example of FIG. 5, the system 200 includes an onboard model 202 operable to produce a compressor exit temperature $T_3$ and a compressor inlet flow $W_{25}$ of one of the gas turbine engines 10A, 10B of FIG. 1 for use by a core temperature model 204. The onboard model 202 is configured to synthesize or predict major temperatures and pressures throughout one of the gas turbine engines 10A, 10B of FIG. 1 beyond those sensed by sensors positioned about the gas turbine engines 10A, 10B. The onboard model 202 and core temperature model 204 are examples of a first thermal model and a second thermal model that may be separately implemented or combined as part of a controller 102 (e.g., FADECs 102A, 102B of FIG. 1).

Engine parameter synthesis is performed by the onboard model 202, and the engine parameter synthesis may be performed using the technologies described in U.S. Patent Publication No. 2011/0077783, the entire contents of which are incorporated herein by reference thereto. Of the many parameters synthesized by onboard model 202 at least two are outputted to the core temperature model 204, $T_3$, which is the compressor exit gas temperature of each gas turbine engine 10A, 10B and $W_{25}$, which is the air flow through the compressor. Each of these values are synthesized by onboard model 202 and inputted into the core temperature model 204 that synthesizes or provides a heat state ($T_{core}$) of each gas turbine engine 10A, 10B. $T_{core}$ can be determined by a first order lag or function of $T_3$ and a numerical value X (e.g., $f(T_3, X)$), wherein X is a value determined from a lookup table stored in memory of controller 102. Accordingly, X is dependent upon the synthesized value of $W_{25}$. In other words, $W_{25}$ when compared to a lookup table of the core temperature model 204 will determine a value X to be used in determining the heat state or $T_{core}$ of each gas turbine engine 10A, 10B. In one embodiment, the higher the value of $W_{25}$ or the higher the flow rate through the compressor the lower the value of X.

The heat state of each engine 10A, 10B during use or $T_{core}$ is determined or synthesized by the core temperature model 204 as each engine 10A, 10B is being run. In addition, $T_3$ and $W_{25}$ are determined or synthesized by the onboard model 202 and/or the controller 102 as each engine 10A, 10B is being operated.

At engine shutdown, the current or most recently determined heat state of the engine or $T_{core\ shutdown}$ of an engine 10A, 10B is recorded into data storage unit (DSU) 104, and the time of the engine shutdown $t_{shutdown}$ is recorded into the DSU 104. The DSU 104 retains data between shutdowns using non-volatile memory. Each engine 10A, 10B may have a separate DSU 104. Time values and other parameters may be received on digital communication bus 106. As long as electrical power is present for the controller 102 and DSU 104, additional values of temperature data may be monitored for comparison with modeled temperature data to validate one or more temperature models (e.g., onboard model 202 and/or core temperature model 204) of each gas turbine engine 10A, 10B.

During an engine start sequence or restart sequence, a bowed rotor start risk model 206 (also referred to as risk model 206) of the controller 102 is provided with the data stored in the DSU 104, namely $T_{core\ shutdown}$ and the time of the engine shutdown $t_{shutdown}$. In addition, the bowed rotor start risk model 206 is also provided with the time of engine start $t_{start}$ and the ambient temperature of the air provided to the inlet of each engine 10A, 10B $T_{inlet}$ or $T_2$. $T_2$ is a sensed value as opposed to the synthesized value of $T_3$. In some embodiments, an oil temperature ($T_{oil}$) is a sensed value that can be used to determine a current temperature in combination with $T_{core}$ and/or $T_2$. For instance, once oil stops circulating at shutdown, $T_{oil}$ can provide a localized temperature reading indicative of a bearing compartment temperature from which temperatures at various engine locations can be derived.

The bowed rotor start risk model 206 maps core temperature model data with time data and ambient temperature data to establish a motoring time $t_{motoring}$ as an estimated period of motoring to mitigate a bowed rotor of each gas turbine engine 10A, 10B. The motoring time $t_{motoring}$ is indicative of a bowed rotor risk parameter computed by the bowed rotor start risk model 206. For example, a higher risk of a bowed rotor may result in a longer duration of dry motoring to reduce a temperature gradient prior to starting each gas turbine engine 10A, 10B of FIG. 1. In one embodiment, an engine start sequence may automatically include a modified start sequence; however, the duration of the modified start sequence prior to a normal start sequence will vary based upon the time period $t_{motoring}$ that is calculated by the bowed rotor start risk model 206. The motoring time $t_{motoring}$ for predetermined target speed $N_{target}$ of each engine 10A, 10B is calculated as a function of $T_{core\ shutdown}$, $t_{shutdown}$, $t_{start}$, $T_2$ and/or $T_{oil}$, (e.g., $f(T_{core\ shutdown}, t_{shutdown}, t_{start}, T_2$ and/or $T_{oil})$, while a target speed $N_{target}$ is a predetermined speed that can be fixed or vary within a predetermined speed range of $N_{targetMin}$ to $N_{targetMax}$. In other words, the target speed $N_{target}$ may be the same regardless of the calculated time period $t_{motoring}$ or may vary within the predetermined speed range of $N_{targetMin}$ to $N_{targetMax}$. The target speed $N_{target}$ may also be referred to as a dry motoring mode speed.

Based upon these values ($T_{core\ shutdown}$, $t_{shutdown}$, $t_{start}$, $T_2$ and/or $T_{oil}$) the motoring time $t_{motoring}$ at a predetermined target speed $N_{target}$ for the modified start sequence of each engine 10A, 10B is determined by the bowed rotor start risk model 206. Based upon the calculated time period $t_{motoring}$ which is calculated as a time to run each engine 10A, 10B at a predetermined target speed $N_{target}$ in order to clear a "bowed condition". In accordance with an embodiment of the disclosure, the controller 102 can run through a modified start sequence upon a start command given to each engine 10A, 10B by an operator of the engines 10A, 10B, such as a pilot of an airplane the engines 10A, 10B are used with. It is understood that the motoring time $t_{motoring}$ of the modified start sequence may be in a range of 0 seconds to minutes, which depends on the values of $T_{core\ shutdown}$, $t_{shutdown}$, $t_{start}$, $T_2$ and/or $T_{oil}$.

In an alternate embodiment, the modified start sequence may only be run when the bowed rotor start risk model 206 has determined that the motoring time $t_{motoring}$ is greater than zero seconds upon receipt of a start command given to each engine 10A, 10B. In this embodiment and if the bowed rotor start risk model 206 has determined that $t_{motoring}$ is not greater than zero seconds, a normal start sequence will be initiated upon receipt of a start command to each engine 10A, 10B.

Accordingly and during an engine command start, the bowed rotor start risk model 206 of the system 200 may be referenced wherein the bowed rotor start risk model 206 correlates the elapsed time since the last engine shutdown time and the shutdown heat state of each engine 10A, 10B as well as the current start time $t_{start}$ and the inlet air temperature $T_2$ in order to determine the duration of the modified start sequence wherein motoring of each engine 10A, 10B at a reduced speed $N_{target}$ without fuel and ignition is required. As used herein, motoring of each engine 10A, 10B in a modified start sequence refers to the turning of a starting spool by air turbine starter 120A, 120B at a reduced speed $N_{target}$ without introduction of fuel and an ignition source in order to cool the engine 10A, 10B to a point wherein a normal start sequence can be implemented without starting the engine 10A, 10B in a bowed rotor state. In other words, cool or ambient air is drawn into the engine 10A, 10B while motoring the engine 10A, 10B at a reduced speed in order to clear the "bowed rotor" condition, which is referred to as a dry motoring mode.

The bowed rotor start risk model 206 can output the motoring time $t_{motoring}$ to a motoring controller 208. The motoring controller 208 uses a dynamic control calculation in order to determine a required valve position of the starter air valve 116A, 116B used to supply an air supply or compressed air source 114 to the engine 10A, 10B in order to limit the motoring speed of the engine 10A, 10B to the target speed $N_{target}$ due to the position of the starter air valve 116A, 116B. The required valve position of the starter air valve 116A, 116B can be determined based upon an air supply pressure as well as other factors including but not limited to ambient air temperature, parasitic drag on the engine 10A, 10B from a variety of engine driven components such as electric generators and hydraulic pumps, and other variables such that the motoring controller 208 closes the loop for an engine motoring speed target $N_{target}$ for the required amount of time based on the output of the bowed rotor start risk model 206. Cross engine data 209 can also be used by the motoring controller 208 to adjust control signals 210 to account for present conditions, commands, and/or scheduled adjustments of the starting system 101A, 101B received on the digital communication bus 106 and/or cross engine bus 106A. Cross engine data 209 can include a number of control parameters such as a dry motoring profile and/or adjustments to a dry motoring profile.

In one embodiment, the dynamic control of the valve position (e.g., open state of the valve (e.g., fully open, ½ open, ¼ open, etc.) in order to limit the motoring speed of the engine 10A, 10B) is controlled via duty cycle control (on/off timing using pulse width modulation) of electromechanical device 110A, 110B for starter air valves 116A, 116B. When variable position starter air valves are used as the starter air valves 116A, 116B, a valve angle 207 can be provided to motoring control 208 based on valve angle feedback. A rotor speed N2 can be provided to the motoring controller 208 and a mitigation monitor 214, where motoring controller 208 and a mitigation monitor 214 may be part of controller 102.

The risk model 206 can determine a bowed rotor risk parameter that is based on the heat stored ($T_{core}$) using a mapping function or lookup table. When not implemented as a fixed rotor speed, the bowed rotor risk parameter can have an associated dry motoring profile defining a target rotor speed profile over an anticipated amount of time for the motoring controller 208 to send control signals 210, such as valve control signals for controlling starter air valves 116A, 116B of FIG. 3.

The bowed rotor risk parameter may be quantified according to a profile curve selected from a family of curves that align with observed aircraft/engine conditions that impact turbine bore temperature and the resulting bowed rotor risk. In some embodiments, an anticipated amount of dry motoring time can be used to determine a target rotor speed profile in a dry motoring profile for the currently observed conditions. As one example, one or more baseline characteristic curves for the target rotor speed profile can be defined in tables or according to functions that may be rescaled to align with the observed conditions.

In summary with reference to FIG. 5, as one example of an aircraft that includes systems as described herein, onboard model 202 and core temperature model 204 may run on controller 102 of the aircraft to track heat stored ($T_{core}$) in the turbine at the time of engine shutdown. Modeling of potential heat stored in the system may be performed as a turbine disk metal temperature model in the core temperature model 204. When the aircraft lands, engines typically operate at idle for a cool down period of time, e.g., while taxiing to a final destination. When an engine shutdown is detected, model state data can be logged by the DSU 104 prior to depowering. When the controller 102 powers on at a later time and model state data can be retrieved from the DSU 104, and the bowed rotor start risk model 206 can be updated to account for the elapsed time. When an engine start is requested, a bowed rotor risk can be assessed with respect to the bowed rotor start risk model 206. Extended dry motoring can be performed during an engine start process until the bow risk has sufficiently diminished.

In reference to FIG. 5, the mitigation monitor 214 can operate in response to receiving a complete indicator 212 to run a verification of the bowed rotor mitigation. The mitigation monitor 214 can provide mitigation results 216 to the motoring controller 208 and may provide result metrics 218 to other systems, such a maintenance request or indicator. The mitigation monitor 214 may also run while dry motoring is active to determine whether adjustments to the dry motoring profile are needed. If the mitigation monitor 214 determines that a bowed rotor condition still exists, the motoring controller 208 may restart dry motoring, or a maintenance request or indicator can be triggered along with providing result metrics 218 for further analysis. Metrics of attempted bowed rotor mitigation can be recorded in the DSU 104 based on determining that the attempted bowed rotor mitigation was unsuccessful or incomplete. Mitigation results 216 and/or result metrics 218 may also be included in the cross engine data 209 exchanged between FADECS 102A, 102B of FIG. 1.

Figure 6:
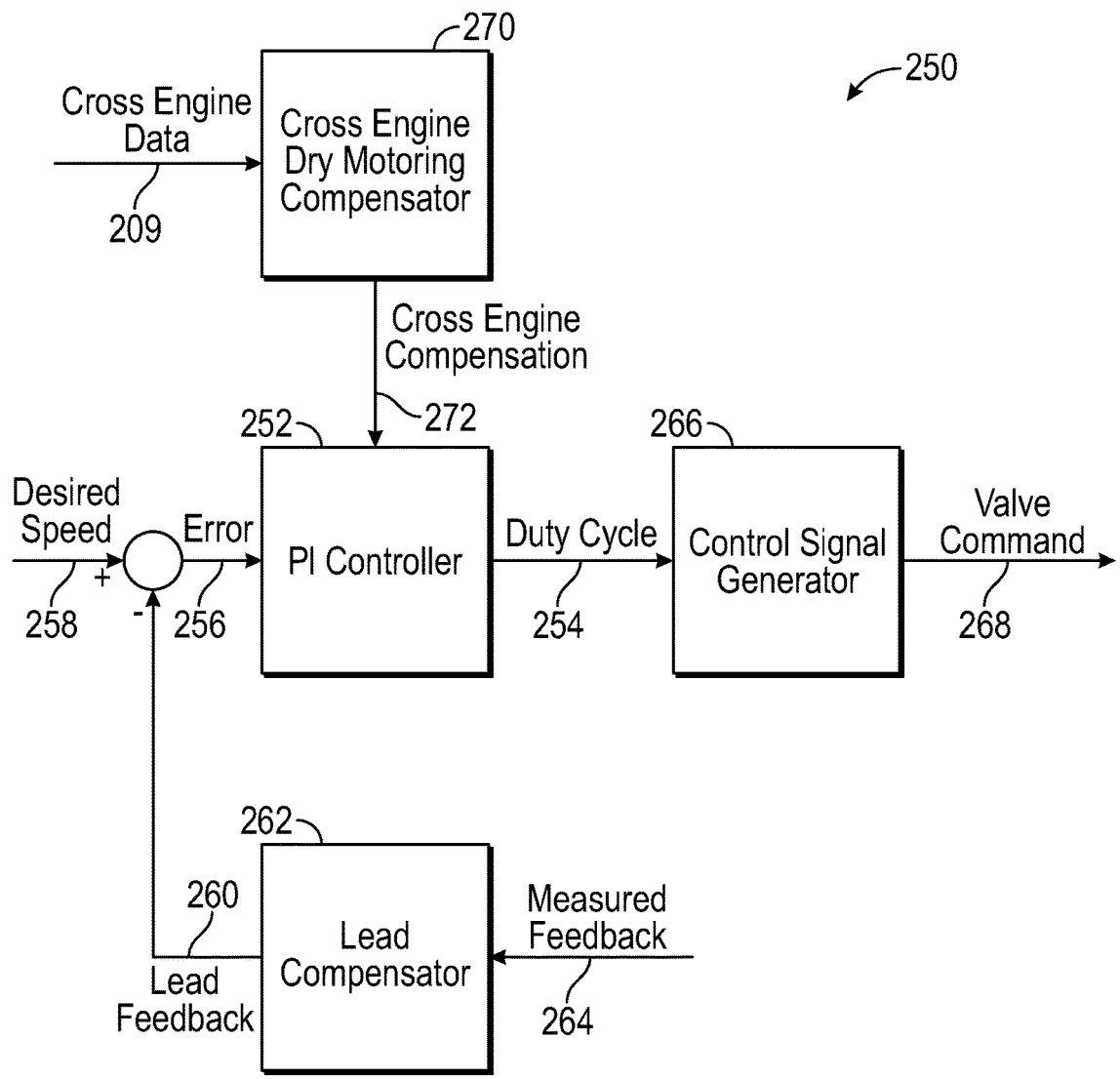
FIG. 6 is a block diagram of a control loop for speed control during dry motoring in accordance with an embodiment of the disclosure.

FIG. 6 is a block diagram of a control loop 250 for speed control during dry motoring in accordance with an embodiment. The control loop 250 may be part of the motoring controller 208 of FIG. 5. In the example of FIG. 6, the control loop 250 includes a proportional-integral controller 252 that can determine a duty cycle 254 based on an error signal 256 as the difference between a desired speed 258 and a lead feedback 260 from a lead compensator 262. The lead compensator 262 can determine the lead feedback 260 based on measured feedback 264, such as engine speed (N2), starter speed (NS), and/or starter air pressure (SAP). In some embodiments, the duty cycle 254 is provided to a control signal generator 266 that outputs a valve command 268, such as pulse width modulation generation for energizing/de-energizing starter valves 116A, 116B. In alternate embodiments, the control signal generator 266 is adjusted based on a valve angle of the starter air valve 116A, 116B.

Cross engine data 209 can be processed by a cross engine dry motoring compensator 270 to produce cross engine compensation 272. In some embodiments, the cross engine compensation 272 inserts a lead, lag, or scaling adjustment into duty cycle 254 to compensate for modifications to aspects of the compressed air attributable to the opposite engine system 100A, 100B. For instance, the cross engine compensation 272 may reset an integrator of the proportional-integral controller 252 in response to the cross engine data 209 including a command to fully close a starter air valve 116A, 116B of the opposite engine system 100A, 100B.

Figure 7:
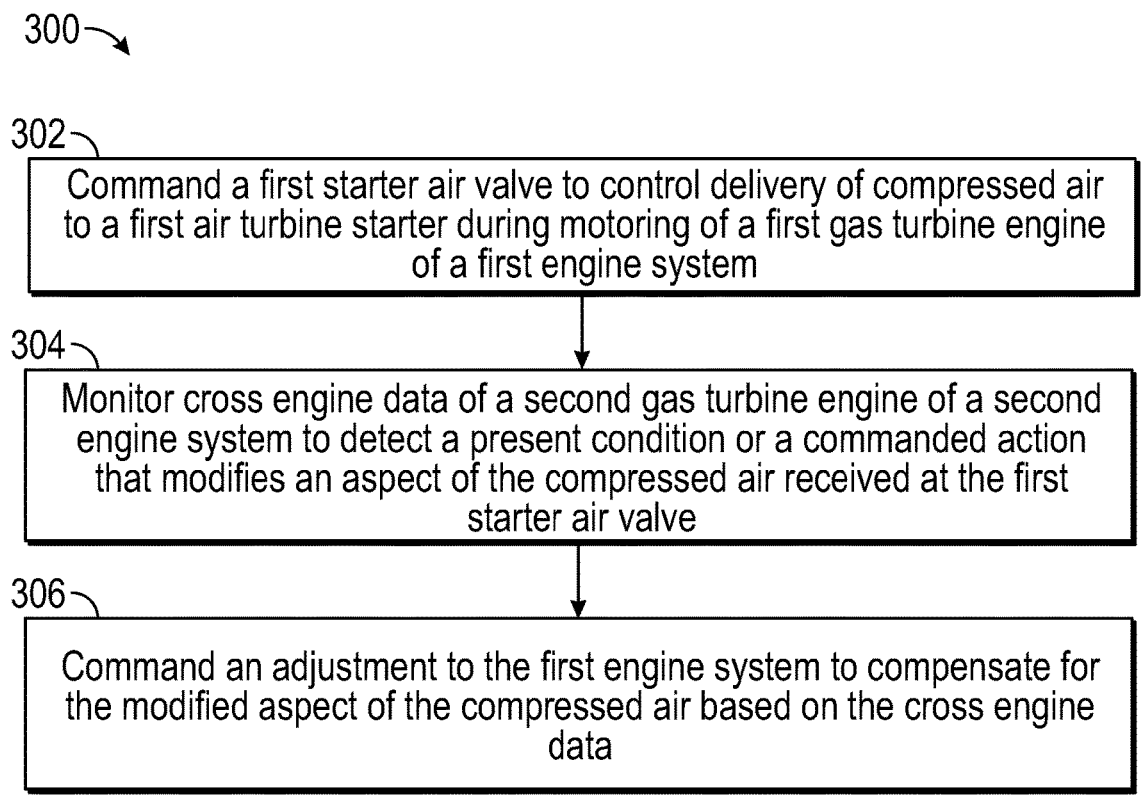
FIG. 7 is a flow chart illustrating a method in accordance with an embodiment of the disclosure.

FIG. 7 is a flow chart illustrating a method 300 for cross engine coordination during gas turbine engine motoring in accordance with an embodiment. The method 300 of FIG. 7 is described in reference to FIGS. 1-6 and may be performed with an alternate order and include additional steps. Before initiating bowed rotor start mitigation, a bowed rotor determination step can be performed to estimate a need for bowed rotor start mitigation. Examples include the use of models and/or stored/observed engine/aircraft state data, such as data received from DSU 104, digital communication bus 106, and/or reading data from one or more temperature sensors of the gas turbine engines 10A, 10B. With respect to the description of method 300, engine system 100A is referred to as a first engine system 100A, while engine system 100B is referred to as a second engine system 100B; however, it will be understood that the first/second designations can be reversed.

At block 302, a first controller (FADEC 102A) commands the first starter air valve 116A to control delivery of compressed air to the first air turbine starter 120A during motoring of the first gas turbine engine 10A of the first engine system 100A. Likewise, a second controller (FADEC 102B) commands the second starter air valve 116B to control delivery of compressed air to the second air turbine starter 120B during motoring of the second gas turbine engine 10B of the second engine system 100B. The compressed air can be driven by an auxiliary power unit 113 of the aircraft 5 or other source such as a ground cart or cross engine bleed. The FADEC 102A can command the first starter air valve 116A based on one or more of: an engine speed (N2) of a starting spool of the first gas turbine engine 10A, a starter speed (NS) of the first air turbine starter 120A, and a starter air pressure (SAP) of the first engine system 100A.

At block 304, the FADEC 102A monitors cross engine data 209 of the second gas turbine engine 10B of the second engine system 100B to detect a present condition or a commanded action that modifies an aspect of the compressed air received at the first starter air valve 116A. The present condition received in the cross engine data 209 can include one or more of: a detected fault condition of the second air turbine starter 120A of the second engine system 100B, a detected fault condition of the second starter air valve 116B of the second engine system 100B, a transition to start motoring of the second gas turbine engine 10B, a transition to stop motoring of the second gas turbine engine 10B, and a control input or modeled value to control motoring of the second gas turbine engine 10B. The commanded action can include a commanded change in state of one or more of: a second starter air valve 116B of the second engine system 100B, an engine shutoff valve 121A, 121B, and a bleed valve 123 operable to release a portion of the compressed air. The cross engine data 209 can alternatively or additionally include a scheduled adjustment of one or more control parameters of the second engine system 100B At block 306, FADEC 102A commands an adjustment to the first engine system 100A to compensate for the modified aspect of the compressed air based on the cross engine data 209. The adjustment to the first engine system 100A can maintain the engine speed of the starting spool of the first gas turbine engine 10A below a resonance speed of the starting spool during motoring. The adjustment to the first engine system 100A may be based on monitoring a rate of change of one or more parameters received in the cross engine data 209.

Accordingly and as mentioned above, it is desirable to detect, prevent and/or clear a "bowed rotor" condition in a gas turbine engine that may occur after the engine has been shut down. As described herein and in one non-limiting embodiment, the FADECs 102A, 102B (e.g., controller 102) may be programmed to automatically take the necessary measures in order to provide for a modified start sequence without pilot intervention other than the initial start request. In an exemplary embodiment, the FADECs 102A, 102B, DSU 104 and/or engine control interfaces 105A, 105B comprises a microprocessor, microcontroller or other equivalent processing device capable of executing commands of computer readable data or program for executing a control algorithm and/or algorithms that control the start sequence of the gas turbine engine. In order to perform the prescribed functions and desired processing, as well as the computations therefore (e.g., the execution of Fourier analysis algorithm(s), the control processes prescribed herein, and the like), the FADECs 102A, 102B, DSU 104 and/or engine control interfaces 105A, 105B may include, but not be limited to, a processor(s), computer(s), memory, storage, register(s), timing, interrupt(s), communication interfaces, and input/output signal interfaces, as well as combinations comprising at least one of the foregoing. For example, the FADECs 102A, 102B, DSU 104 and/or engine control interfaces 105A, 105B may include input signal filtering to enable accurate sampling and conversion or acquisitions of such signals from communications interfaces. As described above, exemplary embodiments of the disclosure can be implemented through computer-implemented processes and apparatuses for practicing those processes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for cross engine coordination during gas turbine engine motoring, the system comprising:
   a first gas turbine engine of a first engine system;
   a first air turbine starter of the first engine system;
   a first starter air valve of the first engine system; and
   a controller operable to command the first starter air valve to control delivery of compressed air to the first air turbine starter during motoring of the first gas turbine engine, monitor cross engine data of a second gas turbine engine of a second engine system to detect a present condition or a commanded action that modifies an aspect of the compressed air received at the first starter air valve, and command an adjustment to the first engine system to compensate for the modified aspect of the compressed air based on the cross engine data.

2. The system as in claim 1, wherein the compressed air is driven by an auxiliary power unit of the aircraft, a ground cart, or a cross engine bleed.

3. The system as in claim 1, wherein the controller commands the first starter air valve based on one or more of: an engine speed of a starting spool of the first gas turbine engine, a starter speed of the first air turbine starter, and a starter air pressure.

4. The system as in claim 3, wherein the adjustment to the first engine system maintains the engine speed of the starting spool of the first gas turbine engine below a resonance speed of the starting spool during motoring.

5. The system as in claim 1, wherein the present condition comprises one or more of:
   a detected fault condition of a second air turbine starter of the second engine system;
   a detected fault condition of a second starter air valve of the second engine system;
   a transition to start motoring of the second gas turbine engine;

a transition to stop motoring of the second gas turbine engine; and a control input or modeled value to control motoring of the second gas turbine engine.

6. The system as is claim 1, wherein the commanded action comprises a commanded change in state of one or more of: a second starter air valve of the second engine system, an engine shutoff valve, and a bleed valve operable to release a portion of the compressed air.

7. The system as in claim 1, wherein the cross engine data further comprises a scheduled adjustment of one or more control parameters of the second engine system.

8. The system as in claim 1, wherein the adjustment to the first engine system is based on monitoring a rate of change of one or more parameters received in the cross engine data.

9. A system of an aircraft, the system comprising:
a compressed air source operable to supply compressed air;
a first engine system comprising a first gas turbine engine, a first air turbine starter, a first starter air valve, and a first controller operable to command the first starter air valve to control delivery of the compressed air to the first air turbine starter during motoring of the first gas turbine engine;
a second engine system comprising a second gas turbine engine, a second air turbine starter, a second starter air valve, and a second controller operable to command the second starter air valve to control delivery of the compressed air to the second air turbine starter during motoring of the second gas turbine engine; and
a communication bus operable to establish communication of cross engine data between the first controller and the second controller, wherein the first controller is operable to command an adjustment to the first engine system based on the cross engine data from the second controller, and the second controller is operable to command an adjustment to the second engine system based on the cross engine data from the first controller.

10. The system of claim 9, wherein the first controller commands the first starter air valve based on one or more of: an engine speed of a starting spool of the first gas turbine engine, a starter speed of the first air turbine starter, and a starter air pressure of the first engine system, and wherein the second controller commands the second starter air valve based on one or more of: an engine speed of a starting spool of the second gas turbine engine, a starter speed of the second air turbine starter, and a starter air pressure of the second engine system.

11. The system of claim 10, wherein the first engine system maintains the engine speed of the starting spool of the first gas turbine engine below a resonance speed during motoring of the first gas turbine engine, and the second engine system maintains the engine speed of the starting spool of the second gas turbine engine below the resonance speed during motoring of the second gas turbine engine.

12. The system of claim 9, wherein the cross engine data comprises one or more of:
a detected fault condition of the first or second air turbine starter;
a detected fault condition of the first or second starter air valve;
a transition to start motoring of the first or second gas turbine engine;
a transition to stop motoring of the first or second gas turbine engine; and
a control input or modeled value to control motoring of the first or second gas turbine engine.

13. The system of claim 9, wherein the cross engine data comprises a commanded change in state of one or more of: the first starter air valve, the second starter air valve, an engine shutoff valve, and a bleed valve operable to release a portion of the compressed air.

14. The system of claim 9, wherein the cross engine data further comprises a scheduled adjustment of one or more control parameters of the first or second engine system.

15. A method for cross engine coordination during gas turbine engine motoring, the method comprising:
commanding, by a controller, a first starter air valve to control delivery of compressed air to a first air turbine starter during motoring of a first gas turbine engine of a first engine system;
monitoring, by the controller, cross engine data of a second gas turbine engine of a second engine system to detect a present condition or a commanded action that modifies an aspect of the compressed air received at the first starter air valve; and
commanding an adjustment to the first engine system to compensate for the modified aspect of the compressed air based on the cross engine data.

16. The method as in claim 15, further comprising commanding the first starter air valve based on one or more of: an engine speed of a starting spool of the first gas turbine engine, a starter speed of the first air turbine starter, and a starter air pressure, wherein the adjustment to the first engine system maintains the engine speed of the starting spool of the first gas turbine engine below a resonance speed of the starting spool during motoring.

17. The method as in claim 15, wherein the present condition comprises one or more of:
a detected fault condition of a second air turbine starter of the second engine system;
a detected fault condition of a second starter air valve of the second engine system;
a transition to start motoring of the second gas turbine engine;
a transition to stop motoring of the second gas turbine engine; and
a control input or modeled value to control motoring of the second gas turbine engine.

18. The method as in claim 15, wherein the commanded action comprises a commanded change in state of one or more of: a second starter air valve of the second engine system, an engine shutoff valve, and a bleed valve operable to release a portion of the compressed air.

19. The method as in claim 15, wherein the cross engine data further comprises a scheduled adjustment of one or more control parameters of the second engine system.

20. The method as in claim 15, wherein the adjustment to the first engine system is based on monitoring a rate of change of one or more parameters received in the cross engine data.

* * * * *